April 11, 1967 C. C. PEASE 3,313,912
ENERGY LIMITING SYSTEM FOR STUD WELDING
Filed June 28, 1963
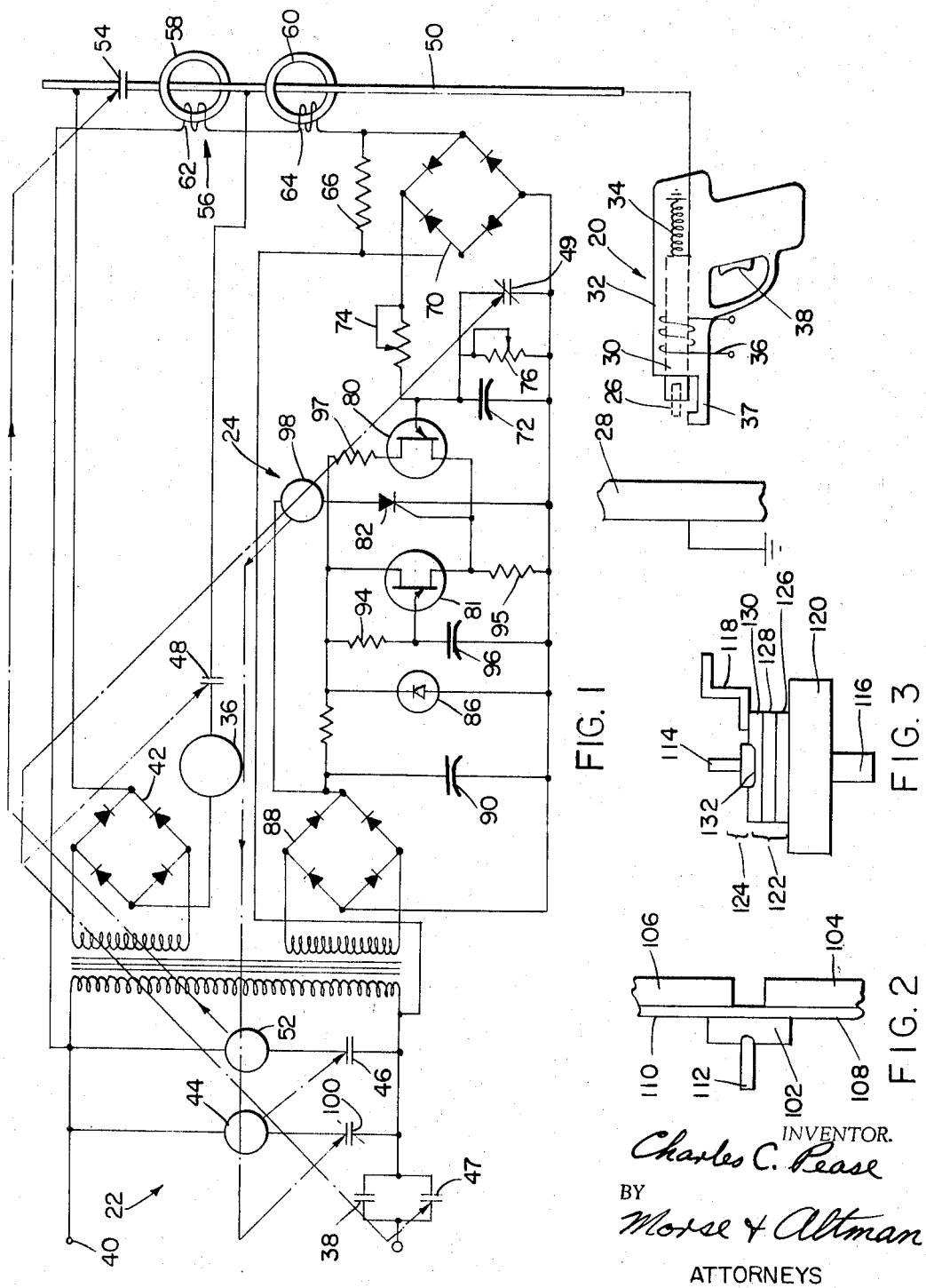
INVENTOR.
Charles C. Pease
BY
Morse & Altman
ATTORNEYS United States Patent Office
3,313,912
Patented Apr. 11, 1967

3,313,912
ENERGY LIMITING SYSTEM FOR
STUD WELDING
Charles Connor Pease, Pennsauken, N.J., assignor to KSM Products, Inc., Moorestown, N.J., a corporation of New Jersey
Filed June 28, 1963, Ser. No. 291,529
3 Claims. (Cl. 219—108)

The present invention relates to electric welding and, more particularly, to stud welding devices in one example of which a stud initially is held in contact with a workpiece while a current is passed across the junction therebetween, next is withdrawn from the workpiece to strike a pilot arc, then is maintained at a distance from the workpiece while a welding arc is produced by a current directed across the ionized path established by the pilot arc and finally is plunged against the workpiece in order to unite molten contiguous portions of the stud and the workpiece. In order to achieve reproducible results, it is necessary that the amount of heating at the contiguous portions of the stud and the workpiece be precisely predetermined at the moment the contiguous portions are united. However, oftentimes the heat produced by the welding arc is variable because, for example, the power source for the welding arc is not stable. Thus, typically: direct current motor generator and rectifier ouputs generally decrease with increased temperature; battery sources decrease in voltage with rapid discharge; and line power is erratic because of the simultaneous presence of other loads.

The primary object of the present invention is to compensate for fluctuation in the heating effect of a welding arc by a novel monitor circuit which essentially includes: a sensor that operates through a reactive coupling to measure the current of the welding arc so that it can be interrupted when a predetermined quantity of heat has been produced.

Another object of the present invention is to provide arc welding devices of the foregoing type in which: reactive coupling is a saturable core reactor that is directly coupled to a rectifier to which an accumulator responds; and the accumulator is a transient network that accumulates a charge to a predetermined level in response to the applied voltage from the saturable core reactor for application to a unijunction transistor that produces a pulse when this preselected level is reached. By virtue of this pulse, the welding arc is cut off at the moment when the quantity of welding energy converted to heat has reached a predetermined magnitude.

A further object of the present invention is to provide a control circuit of the foregoing type in a stud welding system wherein a solenoid lift and spring return arrangement controls the relative positions of the stud and the workpiece. In such a system, the control circuit and the mechanical components of the stud welding apparatus cooperate in an unusually simple manner to produce unusually precise results.

Other objects of the present invention will in part be obvious and will in part appear hereinafter.

The invention accordingly comprises the apparatus possessing the construction, combination of elements and arrangement of parts which are exemplified in the following detailed disclosure, the scope of which will be indicated in the appended claims.

For a fuller understanding of the nature and objects of the present invention, reference should be had to the following detailed description, taken in connection with the accompanying drawings, wherein:

FIG. 1 is a schematic diagram of a stud welding system embodying the present invention;

FIG. 2 is an exaggerated cross-sectional view of one form of a component of the system of FIG. 1; and FIG. 3 is an exaggerated cross-sectional view of one form of another component of the system of FIG. 1.

The system illustrated in FIG. 1 includes a stud welding gun 20, a control circuit 22 and a timing circuit 24. First gun 20 will be described in conjunction with a stud 26 and a workpiece 28. Then control circuit 22 and timing circuit 24 will be described in relation to the operation of gun 20 and the interrelation of their components.

As shown, gun 20 includes a chuck 30 for holding stud 26. Chuck 30 is reciprocable within the housing 32 of gun 20, being biased toward its most outward position by a spring 34 and being withdrawable to its most inward position by a solenoid 36. The chuck is so designed as to be forced into housing 32 when the gun is manually urged against workpiece 28. Under these circumstances, stud 26 bears against workpiece 28, motion of the gun itself toward the workpiece being limited by a suitable stop 37. In operation, when the trigger 38 of gun 20 is actuated, solenoid 36 draws stud 26 from workpiece 28 whereby a pilot arc is struck between the stud and the workpiece. Next, thereafter, as will be explained below, control circuit 22 enables a welding current to flow in order to heat the contiguous portions of stud 26 and workpiece 28 to a molten state and, when timing circuit 24 indicates that a preselected quantity of heat has been generated, solenoid 36 releases chuck 30 to permit spring 34 to plunge stud 26 into contact with workpiece 28. Generally, this welding gun is of the type described in Patent No. 2,796,513, issued on June 18, 1957 in the name of Frank K. Kelemen, for "Stud Welding Apparatus."

Control circuit 22 comprises generally, though not necessarily, an alternating current power input 40, a rectifier 42 for providing direct current to energize solenoid 36 (shown for clarity both mechanically and electrically) and suitable associated switching. More specifically, the control circuit includes the following components, which are described in relation to their functions. Trigger 38 (shown for clarity both mechanically and electrically) constitutes a normally open switch, when trigger 38 is manually actuated, a relay coil 44 is energized by alternating current from source 40. Energization of relay coil 44 closes normally open switches 46, 47 and 48 and opens normally closed switch 49. The closing of switch 48 energizes gun solenoid 36 to lift stud 26 from workpiece 28 and generates a current in welding current cable 50 to establish a pilot arc between the stud and the workpiece. Switch 47 serves as an interlock to maintain current flow from source 40 when trigger 38 is released. The closing of switch 46 energizes a relay coil 52 which closes a contactor switch 54 to establish the welding arc. The opening of normally closed switch 49 removes the short across capacitor 72. The closing of trigger switch 38 also applies alternating current from source 40 to a saturable core reactor 56 now to be described in connection with timing circuit 24.

Saturable core reactor 56 includes a pair of rings 58, 60, each composed of a temporary magnetic material such as soft iron or ferrite. These cores have A.C. windings 62, 64 connected series opposing. These windings are in series with a combination of load resistor 66 across A.C. source 40. With A.C. voltage connected across resistor 66 and reactor 56, very little current flows, due to the high reactance of the cores and, consequently, there is an insignificant voltage drop across the load resistors. Cable 50, carrying the welding current, runs through the centers of these cores as shown. When welding current flows, an increased magnetic field is induced in the cores, reducing their reactance. In other words, the A.C. reactance is inversely proportional to the D.C. magnetic field, which in turn is directly proportional to the current flowing in welding cable 50. As the reactance of the cores decreases with welding current flow in the cable, A.C. current flows in load resistor 66 to produce an A.C. voltage drop thereacross. Therefore, the A.C. voltage across load resistors 66 is proportional to the D.C. welding current in the cable. This A.C. voltage is rectified and utilized to operate the timing circuit in the following manner.

The voltage drop across resistor 66 is rectified by a rectifying bridge 70 in order to charge a capacitor 72 through a variable resistor 74. A trimmer resistor 76 is in parallel with capacitor 72. Resistor 74 and capacitor 72, together with trimmer resistor 76, undergoes a resistance-capacitance transient response, this response being a function of the magnitude of current in cable 50 and the manual adjustment of resistor 74. When the voltage across capacitor 72 reaches a selected level, a unijunction transistor 80 fires and a silicon controlled rectifier 82 conducts in consequence of the bias voltage developed across resistor 95. In consequence, relay 98 is energized thereby opening switch 100, which deenergizes a relay 44. Relay 44 thereby opens switch 47, the trigger interlock, and opens switch 46, deenergizing relay 52. Relay 52 in turn opens switch 54 to interrupt the welding current. Relay 44 also opens switch 48, deenergizing gun solenoid 36 and allowing stud 26 to be plunged against workpiece 28. Relay 44 also closes switch 49, discharging capacitor 72, thereby preparing it for the next welding cycle. As long as trigger 38 is maintained closed, silicon controlled rectifier 82 conducts and relay 98 is maintained energized, thereby preventing any double firing of the circuit. The voltage applied to unijunction transistor 80 is regulated by a zener diode 86, the voltage drop across which is constant. Zener diode 86 is energized by a rectifying bridge 88 through capacitive-resistive coupling 90, 92. In the absence of additional circuitry, unijunction transistor 80 and silicon controlled rectifier 82 would not be able to function when trigger 38 is actuated unless stud 26 is in contact with grounded workpiece 28. The reason for this is that no welding current would flow in cable 50 in order to actuate unijunction transistor 80. Accordingly, a second timer including a unijunction transistor 81 and a resistance-capacitance transient network 94, 96 is provided. Ordinarily when silicon controlled rectifier 82 conducts, a relay 98 is energized to open a switch 100, thereby deenergizing relay 44. In consequence, switch 46 opens, relay 52 deenergizes and switch 54 opens to stop the welding current flow. However, when stud 26 is not grounded, transient network 94, 96 charges to firing voltage in a short safety period, say two seconds. At the end of this safety period, during which unijunction 80 does not fire, unijunction 81 fires to generate sufficient bias across a resistor 95 to cause silicon controlled rectifier 82 to conduct and the cycle to be completed.

As shown in FIG. 2 each unijunction transistor includes an N type silicon bar 102. At one base of silicon bar 102, ceramic ohmic base contacts 104 and 106 are connected by discrete gold strata 108 and 110. Single P type emitter 112, composed for example of aluminum, is fused to the other face of bar 102 at a junction that is located closer to one base than the other so that the device is not symmetrical. In normal operation of the unijunction transistor, base 104 is grounded through a resistor and base 106 is connected to a positive voltage source which applies a positive bias across the bases. This bias establishes a current and an electric field within silicon bar 102 and produces a voltage on the N side of the emitter junction. This voltage is a function $n$ of the applied interbase voltage $V_{BB}$. The function $n$ is termed the intrinsic standoff ratio. If the applied emitter voltage $V_E$ is smaller than $nV_{BB}$, the emitter junction will be reversely biased and only a small leakage current will flow in the emitter circuit. If $V_E$ exceeds $nV_{BB}$ by an amount equal to the forward voltage drop of the emitter diode, the emitter current will increase. Essentially, the path between emitter 102 and base 104 becomes highly conductive as compared to its prior state.

Generally, silicon controlled rectifier 82 is similar to an ordinary rectifier which conducts only in forward direction from an anode 116 to a cathode 114. However, in silicon controlled rectifier 82, a block occurs in the forward direction also until a small voltage, known as the firing voltage is applied between a gate 118 and a cathode 114. Thereafter, conduction continues even though the gate current is stopped, until the anode to cathode current is decreased below a given minimum, known as the holding current. Between anode 116 and cathode 114, in sequence, are a support 120. A PNP assemblage 122 and a PN assemblage 124. PNP assemblage 122 consists of silicon strata 126, 128 and 130. PN assemblage 124 consists of silicon stratum 130 and gold-antimony stratum 132. Gate lead 118 is connected to stratum 130. In essence, silicon controlled rectifier 82 is a PNPN unit with a gate lead connected to the inner P stratum. In operation, the voltage between the gate and the cathode must be above a predetermined minimum before conduction will occur. After conduction occurs, the current will continue even though the gate voltage is removed until the anode to cathode current decreases below a predetermined minimum at which the silicon controlled rectifier returns to the forward blocking state with the gate open.

A complete welding cycle operation is as follows: Trigger 38 on closing, energizes control relay 44, which causes switches 46, 47 and 48 to close simultaneously. Normally closed switch 49 opens at the same time allowing capacitor 72 to charge. When switch 47 closes trigger switch 38 is interlocked. When switch 46 closes, main welding contactor coil 52 energizes, causing welding switch 54 to close. When switch 48 closes, gun solenoid 36 energizes, causing stud 26 to lift from workpiece 28 with a resulting pilot arc. As contactor switch 54 closes, welding current flows through welding cable 50. The D.C. welding current causes an A.C. voltage to be imposed upon load resistors 66, 68. This A.C. voltage is rectified by rectifier 70 and serves to charge capacitor 72 through resistor 74. At the end of the welding cycle, which is predetermined by the magnitude by the current in cable 50 and the setting of resistor 74, unijunction transistor 80 fires to produce a pulse which causes silicon controlled rectifier 82 to conduct, thereby energizing relay 98. The energization of relay 98 causes switch 100 to open, as a result of which, by deenergizing relay 44, switch 47, switch 46 and switch 48 open and switch 49 closes. In consequence the trigger interlock is removed, relay 52 is deenergized interrupting welding current flow in cable 50, solenoid 36 is deenergized, the stud is plunged into a molten pool of metal forming a weld and capacitor 72 is discharged to cause it to return to a condition for another welding cycle.

Numerical values of components of the illustrated embodiment, for example, are as follows:

| | | |
|---|---|---:|
| Resistor 92 | ohms | 470 |
| Resistor 94 | do | 82,000 |
| Resistor 95 | do | 47 |
| Resistor 97 | do | 470 |
| Resistor 74 | ohms potentiometer | 0 to 500,000 |
| Resistor 66 | ohms | 40 |
| Capacitor 90 | microfarads | 10 |
| Capacitor 96 | do | 10 |
| Capacitor 72 | do | 20 |
| Resistor 76 | ohms potentiometer | 0 to 50,000 |

The illustrated embodiment of the present invention thus constitutes a novel stud welding system of unusual simplicity and a few components for effectively timing a stud welding cycle on the basis of integrated energy generated.

Since certain changes may be made in the above system without departing from the scope of the invention herein involved it is intended that all matter contained in the above description or shown in the accompanying drawing shall be interpreted in an illustrative and not in a limiting sense.

What is claimed is:

1. In a stud welding apparatus comprising a chuck for holding a stud, a stop for positioning said stud against a workpiece, a solenoid for withdrawing said stud from said workpiece prior to a discharge of welding current between said stud and said workpiece and a spring for urging said chuck together with said stud, toward said workpiece following said discharge, the improved control circuit comprising an alternating current source, first rectifying bridge means and a master switch serially connected through a welding cable in series with said stud and workpiece, closure of said switch causing current to flow from said rectifying bridge means through said welding cable, said stud and said workpiece, saturable core reactor means surrounding said welding cable, a second rectifying bridge means, an inductor coupled with said saturable core reactor means for providing an input to said second rectifying bridge means, a resistor-capacitor transient network connected across said second rectifying bridge means, said capacitor offering a shunt path for the output of said second rectifying bridge means in such a way as to charge at a predetermined rate in response to said output of said second rectifying bridge means, unijunction transistor means characterized by an emitter and a pair of bases, said emitter being connected to one terminal of said capacitor, said unijunction transistor means being adapted to conduct between said bases when the voltage level at said emitter is at a predetermined level, said bases of said unijunction transistor means generating a sharp pulse when said emitter reaches said predetermined level, a third rectifying bridge means energized by said transformer, said third rectifying bridge means and a zener diode being connected in parallel across said bases of said unijunction transistor means in order to supply power thereto, a silicon controlled rectifier and a solenoid serially connected across said third rectifying bridge means, said silicon controlled rectifier having an emitter, a collector and a control electrode, said emitter of said silicon controlled rectifier being connected to said solenoid, said collector of said silicon controlled rectifier being connected to a terminal of said third rectifying bridge means, said control electrode of said silicon controlled rectifier being connected to one terminal of said unijunction transistor, said silicon controlled rectifier normally being biased at cutoff but being adapted to conduct and thereby to energize said solenoid under the control of said control electrode when a pulse is emitted by said unijunction transistor, said solenoid controlling said master switch of said welding cable, whereby upon discharge of said first rectifying bridge means through said welding cable, said stud and said workpiece in order to effect a weld, said saturable core reactor generates a signal that is applied to said second rectifying bridge means in order to charge said capacitor of said transient network, said unijunction transistor means emits a pulse at the moment said capacitor reaches a predetermined charge level, said silicon control rectifier discharges and said solenoid opens said master switch in order to precisely time said discharge through said cable.

2. The device of claim 1 wherein said saturable core reactor means consists of a pair of magnetizable rings about said welding cable, the coupling between said rings and said second rectifying bridge means being in the form of opposed inductive loops, so arranged as to minimize stray signals.

3. The device of claim 1 wherein said unijunction transistor means includes a pair of unijunction transistors in parallel, the emitter of one of said pair of unijunction transistors being controlled by said capacitor of said transient network, and the emitter of the other of said pair of unijunction transistors being controlled by another capacitor.

References Cited by the Examiner
UNITED STATES PATENTS

| | | | |
|---|---|---|---|
| 2,694,762 | 11/1954 | Ruetschi | 219—110 |
| 2,796,513 | 6/1957 | Kelemen et al. | 219—98 |
| 3,024,353 | 3/1962 | Brashear | 219—130 |

ANTHONY BARTIS, *Primary Examiner.*

RICHARD M. WOOD, *Examiner.*

R. F. STAUBLY, *Assistant Examiner.*